United States Patent [19]

Ainslie et al.

[11] Patent Number: 4,936,650
[45] Date of Patent: Jun. 26, 1990

[54] OPTICAL WAVE GUIDES

[75] Inventors: Benjamin Ainslie; Susan Craig, both of Ipswich; Steven T. Davey, Felixstowe, all of England

[73] Assignee: British Telecommunications public limited company, United Kingdom

[21] Appl. No.: 204,599

[22] Filed: Jun. 9, 1988

Related U.S. Application Data

[63] Continuation-in-part of Ser. No. 28,213, Mar. 20, 1987, Pat. No. 4,799,946, and Ser. No. 52,979, May 22, 1987.

[30] Foreign Application Priority Data

| Apr. 24, 1986 | [GB] | United Kingdom | 8610053 |
| Jun. 4, 1986 | [GB] | United Kingdom | 8613525 |
| Jun. 11, 1987 | [GB] | United Kingdom | 8713698 |

[51] Int. Cl.⁵ .................. G02B 6/16; C03C 13/04
[52] U.S. Cl. ................................ 350/96.34; 501/37
[58] Field of Search .................. 350/96.29–96.34; 501/37; 372/6

[56] References Cited

U.S. PATENT DOCUMENTS

| 3,254,031 | 5/1966 | De Paolis et al. | 350/96.34 |
| 3,503,764 | 3/1970 | Young | 350/96.34 X |
| 3,571,737 | 6/1968 | Miller | 330/4.3 |
| 3,599,106 | 8/1971 | Snitzer | 330/4.3 |
| 3,615,766 | 10/1971 | Piesslinger et al. | 350/96.34 X |
| 3,636,473 | 1/1972 | Young | 372/33 |
| 3,785,834 | 1/1974 | Rapp | 350/95.34 X |
| 3,808,549 | 4/1974 | Maurer | 372/6 |
| 3,864,113 | 2/1975 | Dumbaugh et al. | 65/3.12 X |
| 3,894,857 | 7/1975 | Uchida et al. | 65/3 |
| 3,938,974 | 2/1976 | Macedo et al. | 65/3.15 |
| 3,971,645 | 7/1976 | Bachmann et al. | 65/3.12 |
| 4,040,890 | 8/1977 | Burrus, Jr. et al. | 156/605 |
| 4,149,772 | 4/1979 | Iyengar et al. | 350/96.33 |
| 4,283,213 | 8/1981 | Akers et al. | 65/3.11 |
| 4,419,115 | 12/1983 | Johnson, Jr. et al. | 65/3.12 |
| 4,597,787 | 7/1986 | Jacobson | 65/3.12 |
| 4,618,211 | 10/1986 | Fleury, V | 350/96.34 X |
| 4,637,025 | 1/1987 | Snitzer et al. | 372/1 |
| 4,666,486 | 5/1987 | Hutta | 65/3.11 |
| 4,715,679 | 12/1987 | Bhagavatula | 350/96.33 |
| 4,726,652 | 2/1988 | Tajima et al. | 350/96.34 |
| 4,780,877 | 10/1988 | Snitzer | 372/6 |

FOREIGN PATENT DOCUMENTS

| 8701110 | 2/1987 | European Pat. Off. |
| 2417963 | 8/1975 | Fed. Rep. of Germany |
| 2238679 | 2/1975 | France |
| 2339266 | 8/1977 | France |
| 8607348 | 12/1986 | PCT Int'l Appl. |
| 2140169 | 11/1984 | United Kingdom |

OTHER PUBLICATIONS

Electronics, vol. 43, No. 20, 28th Sep. 79, pp. 129–130, N.Y., U.S.: "Glass Laser Fibers Help Transmit and Amplify Beams".
Optical Fiber Communication Conference, Technical Digest, 24th–26th Feb. 86, Atlanta, Ga., Paper TUL15, pp. 62–64, IEEE, N.Y., U.S.: R. J. Mears et al: "Rare-Earth-Doped Fiber Lasers".
Applied Physics Letters, vol. 23, No. 7, 10.1.73, pp. 388–389, Amer. Inst. of Physics: J. Stone et al: "Neodymium-Doped Silica Lasers in End-Pumped Fiber Geometry":.
Electronics Letters, vol. 22, No. 8, 10th Apr. 1986, pp. 411–412, Hitchin, Herts, GB; S. Patela et al: "Non Linear Prism Coupling in Wave Guiding Structures Deposited on to Semiconductor-Doped Glass".
Soviet Journal of Quantum Electronics, vol. 12, No. 10, Oct. 1982, pp. 1343–1345, New York, U.S.; V. G. Abashkin et al: "Non Linear Absorption of Light in (List continued on next page.)

Primary Examiner—John D. Lee
Attorney, Agent, or Firm—Nixon & Vanderhye

[57] ABSTRACT

Glass fibre suitable for use as the core in fibre lasers and/or amplifiers has a core which consists of a continuous glass phase and a dispersed phase of crystallites. The preferred crystallites are the oxides and phosphates of rare earth metals, e.g. $Nd_2O_3$ and $NdP_5O_{14}$. The small size concentration and distribution of the crystallites keeps the attenuation down to acceptable levels.

18 Claims, 2 Drawing Sheets

OTHER PUBLICATIONS

Glassy Arsenic Surlfide Fibers in the Energy Range Hnu less than Eg".

Soviet Journal of Quantum Electronics, vol. 12, No. 12, Dec. 1982, pp. 1571-1574, New York, U.S.; V. G. Abashkin et al: "Glassy Chalcogenide Semiconductor Fibers".

Journal of the Optical Society of America, vol. 73, No. 5, May 1983, pp. 647-653, New York, U.S.; R. R. Jain et al: "Degenerate Four-Wave Mixing in Semiconductor-Doped Glasses".

Digest of technical Papers: Conference on Lasers and Electro Optics, 21st-24th May 1985, pp. 290, OSA-/IEEE, Baltimore, Md., U.S.; S. S. Yau et al: "Ultrafast Optical Signal Processing Using Semiconductor-Doped Glasses".

Electronics Letters, 15th Aug. 1985, vol. 21, No. 17, "Fabrication of Low-Loss Optical Fibres Containing Rare-Earth Ions", pp. 737-738.

Journal of the American Ceramic Society, vol. 56, No. 2, Feb. 1973, pp. 68-72; E. A. Weaver et al: "Lasing in a Phase-Separated Glass".

Journal of the Electrochemical Society, vol. 122, No. 1, Jan. 1975, pp. 101-107; F. Auzel et al: "Rare Earth Doped Vitroceramics: New, Efficient, Blue and Green Emitting Materials for Infrared Up-conversion".

Japanese Journal of Applied Physics, vol. 23, No. 6, part 2, Jun. 1984, pp. L409-L411, Tokyo, JP: H. Namikawa et al: "Preparation of $SiO_2$ Glasses by Axial Injection Plasma Torch CVD and Their Fluorescence Properties".

OPTICAL WAVE GUIDES

This application is a continuation-in-part of earlier filed, commonly assigned, copending applications Ser. No. 07/028,213 filed Mar. 20, 1987 (now U.S. Pat. No. 4,799,946) and Ser. No. 07/052,979 filed May 22, 1987.

This invention relates to wave guides which have properties appropriate for use in lasing devices. Thus they may be used, for example, as components of signal sources and signal amplifiers in optical telecommunications systems.

Because of their potential importance in telecommunications, there has been substantial interest in devices implemented in fibre configurations, eg fibre lasers and fibre amplifiers. Much of this work has utilised glasses which contain ions with laser properties, eg $Nd^{3+}$ ions. These ions are incorporated as part of the glass, eg they are incorporated in an amorphous phase or a solid solution. These special glasses constitute the path region of optical waveguides, eg the core of an optical fibre. During use, the device is pumped to produce a population inversion of the active ions so that lasing occurs.

It has only been possible to make glass which contains a limited concentration of active ions homogeneously dispersed throughout the glass before phase changes take place in the glass. It is desirable to increase their concentration, eg in order to make high gain short length devices. Weaver, Stewart and Neilson, in "Journal of the American Ceramic Society" vol 56 no 2 published February 1973 at pages 68 to 72 discuss the lasing parameters in a phase separated glass. They report that small amounts of phase separation increased the lasing efficiency but in general efficiencies decreased. Auzel et al in French patent specification 2238679 and in the "Journal of the Electrochemical Society" Vol. 122, No. 1 published January 1975 at pages 101–107 discuss rare earth doped vitroceramics for infrared up-conversion.

According to this invention, an optical wave guide with fluorescing or lasing properties has a path region formed of a glass composition comprising a continuous glass phase having dispersed therein crystallites with fluorescing or lasing properties.

It has surprisingly been found that wave guides of this nature have properties useful for lasers (and optical amplifiers). It would be expected that the disperse phase in the path region would cause scatter and hence give rise to unacceptably high attenuations at both pump and signal wavelengths. However, the size and concentration of the crystallites can be controlled so that the scatter attenuation is kept to an acceptably low level, eg below 10 dB/m and preferably below 1 dB/m based on fibre made from the glass. It will be appreciated that the use of a disperse phase avoids solubility limits, whereby higher concentrations of active lasing sites are possible.

It has also been reported that lasing ions can affect one another. Thus, even when solid solutions are chemically stable, active sites in close proximity interact adversely with one another and the performance of the laser is poor, a phenomenon known as concentration quenching. The crystallites can be made to operate by a different mechanism and the problem be avoided. Thus the use of crystallites gives good lasing action.

The (conventional) silica based glasses are suitable for use as the continuous phase. While the primary component of these glasses is $SiO_2$ other components are often present, especially $GeO_2$ to increase the refractive index. Other dopants may also be present, eg to adjust melting points to facilitate lower processing temperatures and increase choice of host glass, eg $P_2O_5$, F, $Al_2O_3$.

The chemical species suitable for the crystallites includes rare earth oxides and phosphates. The phosphates conveniently have the formula $X'P_5O_{14}$ where $X'$ represents one or more rare earth elements. The oxides are $X''_2O_3$ where $X''$ represents one or more rare earth elements. The following are quoted as specific examples of suitable chemical species:

| | |
|---|---|
| $NdP_5O_{14}$ | |
| $LaP_5O_{14}$ | |
| $CeP_5O_{14}$ | |
| $La_xNd_{(1-x)}P_5O_{14}$ | where x is between 0 and 1 |
| $Ce_yNd_{(1-y)}P_5O_{14}$ | where y is between 0 and 1 |
| $[X''_zNd_{(1-z)}]_2O_3$ | where z is 0 to 1 inclusive and $X''$ is selected from La, Gd and Y. |

Since the disperse phase will, at some time in its history, have been in chemical equilibrium with the continuous phase, the continuous phase will usually contain the rare earth as a dissolved species.

This invention also includes optical waveguides in the form of optical fibre, which may be either multimode or monomode at the signal wavelength, wherein the core is made of a glass composition as described above and the cladding is made of a different glass composition having a lower refractive index.

For example, a fibre comprises a cladding consisting essentially of $SiO_2$ with a core consisting essentially of $SiO_2+GeO_2$ (to raise the refactive index) and the dispersed lasing dopant. To minimise attenuation it would be desirable for the fibre to consist of, ie. to consist only of, the components mentioned. However, it is usually convenient to introduce processing additives, eg. $P_2O_5$ and F, and this can be done without changing the essential properties of the glass.

The glass composition which forms the path region of a wave guide according to the invention is conveniently made by preparing the crystallites from a precursor composition, eg. a single phase composition. The preparation may involve the simple precipitation of a dissolved species, eg. the precipitation of a dissolved rare earth oxide from an oxide glass such as $SiO_2+GeO_2$. Alternatively it may involve the reaction of precursors to give, a new species, eg. the reaction of oxides with $P_2O_5$ to yield a precipitated phosphate.

Modern processes for making optical fibre usually include the preparation of the various glasses by deposition from a vapour phase oxidation reaction. The deposition is controlled to produce a suitable configuration for the mechanical preparation of the fibre. Typical preparation reactions include:

(i) $SiCl_4+O_2=SiO_2+2Cl_2$
(ii) $GeCl_4+O_2=GeO_2+2Cl_2$
(iii) $4XCl_3+O_2=2X_2O_3+6Cl_2$ (where X is a rare earth)

Other reactants may also be used, eg volatile organometallic compounds which convert to the oxide, eg at high temperature and in the presence of oxygen.

Various embodiments of the invention will now be described by way of example with reference to the accompanying drawing in which.

Figure 1:
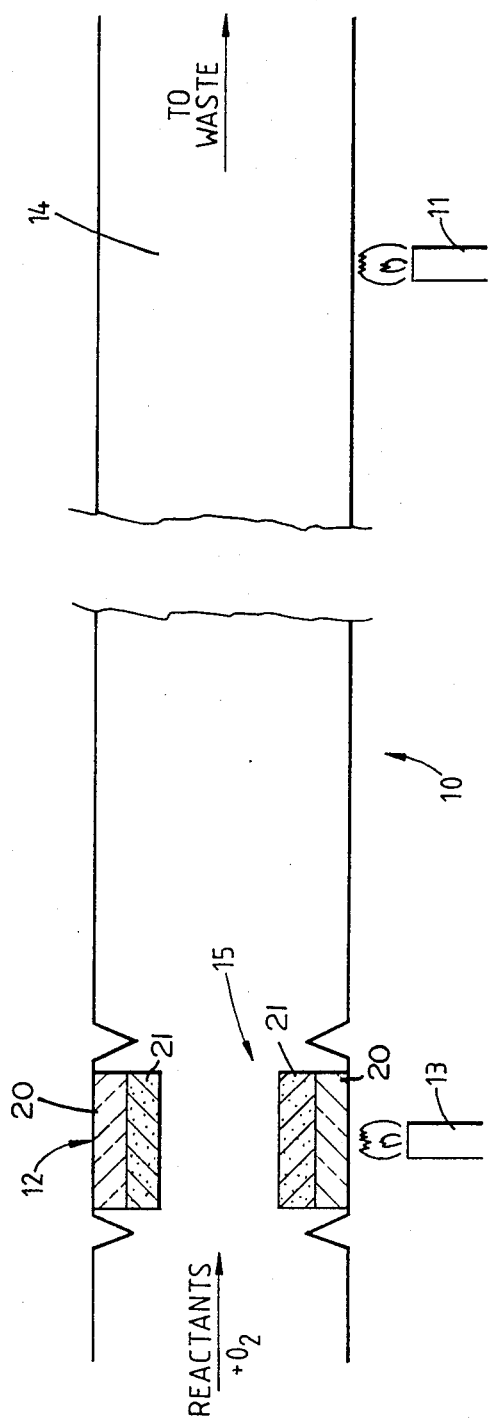
FIG. 1 illustrates, diagrammatically, MCVD used to prepare fibre according to the invention.

FIG. 1 illustrates a conventional MCVD process in which a substrate tube 10 is rotated in a glass blowing lathe (not shown) and a reactant gas which comprises $O_2$ and $SiCl_4$ together with dopants such as $POCl_3$ (to adjust melting point) and $GeCl_4$ (to increase the refractive index). A short segment of the tube, about 2 cm long, is heated to about 1600° C. by means of a travelling flame 11. In this segment chlorides are converted into oxides which deposit in the form of a porous ring downstream of the flame 11. As the flame traverses the deposit fuses to form a thin layer of non-porous glass on the inner surface of the substrate tube 10.

Upstream of the deposition zone 14, the substrate tube 10 is formed into a source chamber 15 which contains a glass sponge 12 which is impregnated with the chloride of a rare earth metal. An independent burner 13 is provided to heat the source chamber 15.

Figure 2:
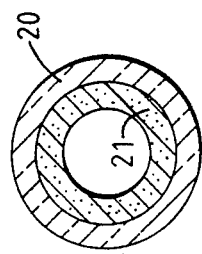
FIG. 2 illustrates a source of rare earth for use in the MCVD illustrated in FIG. 1.

As shown in FIG. 2 the sponge 12 comprises an outer layer 20 of non-porous glass and an inner layer 21 of spongy glass. The inner layer 21 is impregnated with the rare earth metal chloride. The sponge was prepared by depositing a porous layer on the inner surface of a substrate tube about 1 m long using MCVD technique as described above. The sponge was soaked with an alcoholic solution of the hydrated chloride. Excess solution was removed and the solvent was evaporated. Water of crystallisation was removed by heating in the presence of chlorine. The long tubular sponge was cut into segments about 2 cm long.

(The sponge 12 as well as its preparation and use is described in our co-pending applications BT patent case A23468).

Using the MCVD technique mentioned above conventional reactants, eg $SiCl_4$, $POCl_3$, $CCl_2F_2$ and $O_2$, were passed into the bore of a substrate tube and several glass layers were deposited on its inner surface. These layers constituted the precursor of the cladding of a fibre and they had the chemical composition of $SiO_2$ glass doped with $P_2O_5$ and F as melting point modifiers.

Thereafter the reactants were changed to $SiCl_4$, $POCl_3$, $GeCl_4$ and $O_2$ to deposit several layers constituting the precursor of the core of the fibre. During this deposition independent burner 13 was used to volatalise $NdCl_3$ into the reactant stream. Thus the chemical composition of the core precursor was $SiO_2$ glass doped with $GeO_2$, $P_2O_5$ and $Nd^{3+}$. Finally the tube was collapsed and drawn into fibre in the conventional way. Because there was a high concentration of rare earth, the oxide precipitated as a colloid at some stage during the process.

The attenuation of the fibre was measured at wave lengths of interest in the band 500 to 1700 nm. There are two mechanisms which cause the measured attenuation, namely absorption (by rare earth ions) and scatter. Both the continuous phase and the dispersed particles contribute to the absorption but only the dispersed particles cause scatter. The following attenuations were recorded:

| Wave length (nm) | Attenuation (dB/m) |
|---|---|
| 530 | 33 |
| 800 | 50 |
| 880 | 11 |
| 1060 | below 0.1 |

800 nm is the pump wave length (and 106 nm is the signal wave length). Since $Nd^{3+}$ absorbs at its pump wave length there is a high (50 dB/m) attenuation. $Nd^{3+}$ does not absorb at its signal wave length and the low attenuation (below 0.1 dB/m) is due to scatter.

This attenuation is acceptable for a laser device because using these high concentrations of lasing material the length of a device is likely to be less than 1 m and almost certainly less than 10 m. In any case the gain outweighs the loss and, therefore, a small increment in the length of the device compensates for the loss.

It is surprising that the two-phase system produces fibre which is low in loss. It is believed that the attenuation is low because the particle size is low, eg less than 0.1 of the pump wavelength. We have measured particle sizes typically 20 nm in diameter embedded in the glass matrix using transmission electron microscopy. The average concentration of $Nd^{3+}$ in the core was measured to be approximately $10^3$ ppm by weight.

We have measured the fluorescence spectrum of this core glass and observed sharp emission spikes superimposed on the board fluorescence bands. This, we believe, is due to fluorescence from the crystallites (the sharp peak component) and from the $Nd^{3+}$ ions homogenously distributed in the glass (broad component).

In a second example we have made $Er^{3+}$ doped fibre in a way very similar to that described above, but $ErCl_3$ has been used instead of $NdCl_3$. Using a $SiO_2$-$P_2O_5$-$GeO_2$ host glass an average concentration of $7 \times 10^3$ ppm $Er^{3+}$ resulted. Visual inspection of the preform under intense white light illumination showed that white light could be observed from the side of the preform core. When drawn into fibre, the scatter loss was measured at 750 nm (where $Er^{3+}$ does not absorb) and was found to be very low (less than 0.2 db/m), but the absorption bands were very strong:

| Wave length (nm) | Attenuation (dB/m) |
|---|---|
| 630 | 40 |
| 810 | 11 |

A strong band located at 520–530 nm was too intense to be resolved.

An alternative method of making fibre by MCVD (not illustrated) comprises depositing the cladding precursors conventionally and then depositing core precursors without the rare earth and at a low temperature so that the core precursors remain porous. After cooling, the porous layers of the cladding precursor are soaked with an alcoholic solution of a rare earth halide. The excess liquid is drained away, the solvent evaporated and the chloride dehydrated by heating with a mixture of $Cl_2/O_2$. At this stage the porous layer is fused and thereafter collapsed. Drawing proceeds as in the first described technique.

Figure 3:
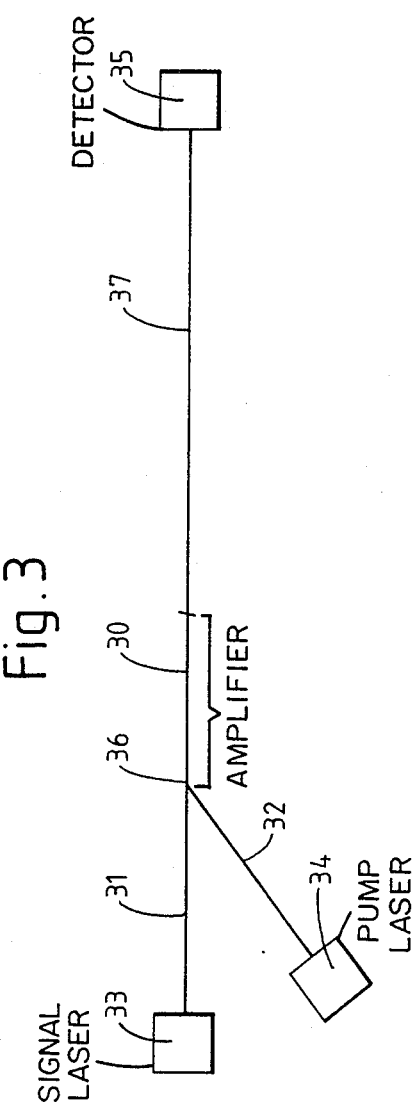
FIG. 3 illustrates an amplifier including fibre according to this invention.

FIG. 3 illustrates an arrangement to demonstrate the amplifying utility of fibre according to the invention.

Fibre 30, having a core consisting of rare earth dopant crystallite embedded in a glass matrix, is connected, at a junction 36, to (non-lasing) optical fibres 31 and 32.

Fibre 32 is coupled to a laser 34 which provides pump frequency into the core of fibre 30. Fibre 31 is connected to a laser 33 which generates an optical signal.

The output end of fibre 30 is welded to a fibre 37. Detector 35 is coupled to the end of fibre 37.

In the use of the device, pump 34 causes a population inversion in the rare earth atoms contained in the core of fibre 30 and photons of signal, from laser 33, stimulate emmission from the inversion whereby amplified signals pass into fibre 37 for detection in detector 35.

We wish to draw attention to two sets of our co-pending patent applications.

Case 23468 (mentioned above and now U.S. Pat. No. 4,799,946) relates to the use of glass sponges to incorporate rare earths into optical fibre. The priority application was filed on 24 Apr. 1986 in GB. The application number is 8610053 (now abandoned). Equivalent cases exist in:

Canada filed 18 Mar. 1987
EPO filed 27 Mar. 1987 (87302674)
Japan filed 23 Mar. 1987 (87-101699)
USA filed 20 Mar. 1987 (028213)

Case 23492 corresponding to U.S. patent application Ser. No. 07/052,979 filed May 22, 1987 relates (among other things) to optical fibres which contain colloidal particles in its core and/or cladding. The priority application was filed on 4 June 1986 in GB. The application number is 8613525. Foreign equivalents were filed in Canada, Japan and USA. The EPO case was filed on 20 May 1987 (87304500).

We claim:

1. An optical wave guide with fluorescing or lasing properties which has a path region formed of a glass composition wherein said glass composition comprises a continuous glass phase having dispersed therein crystallites with fluorescing or lasing properties, wherein the crystallites comprise oxides and phosphates of rare earth metals.

2. A laser device which comprises an optical wave guide according to claim 1, and means for providing pump frequency radiation into the path region thereof.

3. An optical amplifier which comprises a laser device according to claim 3, means for providing an input optical signal into its path region and means for extracting amplified signals from its path region.

4. An optical fibre with fluorescing or lasing properties which fibre has a core formed of a first glass composition and a cladding surrounding said core, said cladding being formed of a second glass composition which has a lower refractive index than said first glass composition wherein said first glass composition comprises a continuous glass phase having dispersed therein crystallites with fluorescing or lasing properties.

5. An optical fibre according to claim 4, which has a scatter attenuation of less than 10 dB/m at signal wave length.

6. An optical fibre according to claim 5, wherein the scatter attenuation is less than 1 dB/m.

7. A fibre according to claim 4, wherein the crystallites are selected from the group consisting of the oxides and phosphates of rare earth metals.

8. A fibre according to claim 7, wherein the oxides have the formula $X''_2O_3$ where $X''$ represents rare earth metals.

9. A fibre according to claim 7, wherein the phosphates have the formula $X'P_5O_{14}$ where $X'$ represents rare earth metals.

10. A fibre according to claim 7, wherein the rare earth metals are selected from Nd, La, Ce, Gd and Y.

11. A fibre according to claim 7, wherein the crystallites are selected from:

| | |
|---|---|
| $Nd\ P_5O_{14}$ | |
| $La\ P_5O_{14}$ | |
| $Ce\ P_5O_{14}$ | |
| $La_xNd_{(1-x)}P_5O_{14}$ | where x is between 0 and 1 |
| $Ce_yNd_{(1-y)}P_5O_{14}$ | where y is between 0 and 1 |
| $[X''_zNd_{(1-x)}]_2O_3$ | where z is 0 to 1 inclusive and $X''$ is selected from La, Gd and Y. |

12. A fibre according to claim 7, wherein the glass composition of the core contains between 1 ppm and $10^5$ ppm by weight of the rare earth element.

13. A fibre according to claim 4, wherein the continuous phase of the first glass composition consists essentially of a mixture of $SiO_2$ and $GeO_2$.

14. A fibre according to claim 13, wherein the second glass composition consists essentially of $SiO_2$.

15. An optical waveguide suitable for use as an optical laser or amplifier, said waveguide comprising:
   a core having a continuous glass composition first phase made from a mixture of at least two different glass forming materials to provide said continuous glass composition phase having a first refractive index;
   said core also having crystallites of rare earth metal oxides or phosphates with fluorescing properties in a second crystalline phase dispersed within said first phase; and
   a cladding layer of glass composition disposed about said core and having a second refractive index lower than said first refractive index.

16. An optical waveguide as in claim 15 wherein said core contains less than $10^5$ ppm by weight of said rare earth material.

17. An optical waveguide as in claim 15 wherein said first phase of the core comprises both $GeO_2$ and $SiO_2$.

18. An optical waveguide as in claim 15 wherein said first phase of the core comprises at least three components: $GeO_2$, $P_2O_5$ and $SiO_2$.

* * * * *